March 24, 1970   J. W. HUDSON   3,502,441
APPARATUS FOR NEUTRALIZING ACIDS WITH AMMONIA
Filed Nov. 25, 1966   4 Sheets-Sheet 3

INVENTOR:
JOHN W. HUDSON
BY
*Carl C. Batz*
ATT'Y

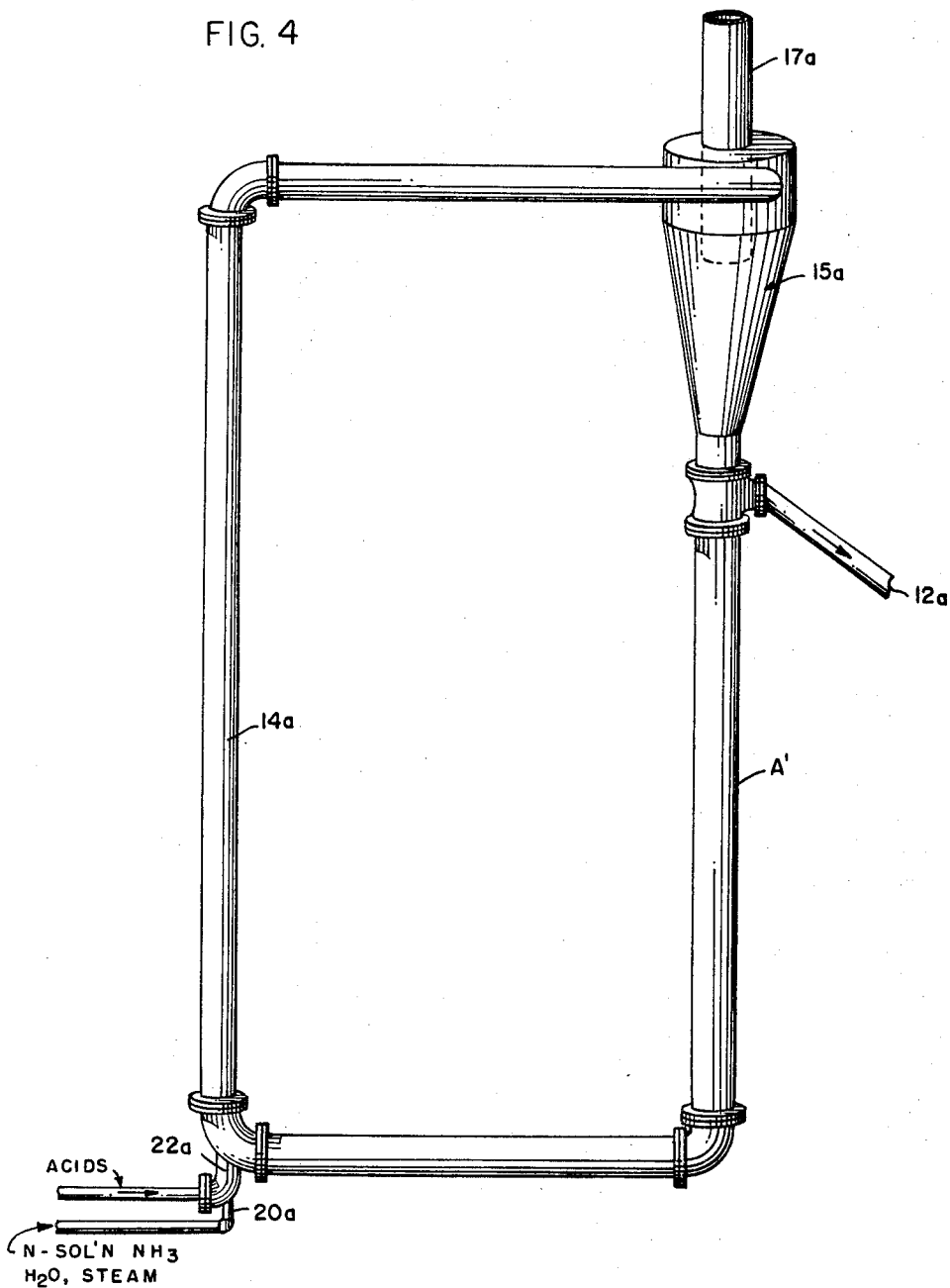

United States Patent Office

3,502,441
Patented Mar. 24, 1970

3,502,441
APPARATUS FOR NEUTRALIZING ACIDS WITH AMMONIA
John W. Hudson, Atlanta, Ga., assignor, by mesne assignments, to United States Steel Corporation, a corporation of Delaware
Filed Nov. 25, 1966, Ser. No. 596,903
Int. Cl. C05b 1/10
U.S. Cl. 23—259.1                                    1 Claim

ABSTRACT OF THE DISCLOSURE

This invention relates to apparatus for neutralizing acids, such as phosphoric, sulfuric, nitric, or combinations of these with ammonia, and the invention is particularly useful for increasing the production rate of high nitrogen fertilizers. The apparatus includes a cyclone separator which may be supported above a reservoir for discharging into the reservoir and a slurry recycle conduit communicating with the lower portion of the reservoir and cyclone separator and providing a generally vertical reaction leg which extends upwardly and discharges tangentially into the separator, means being provided for introducing into the bottom of the vertical leg acid and ammonia whereby the heat of reaction generates steam which propels the slurry upward and onto the walls of the separator.

---

Figure 1:
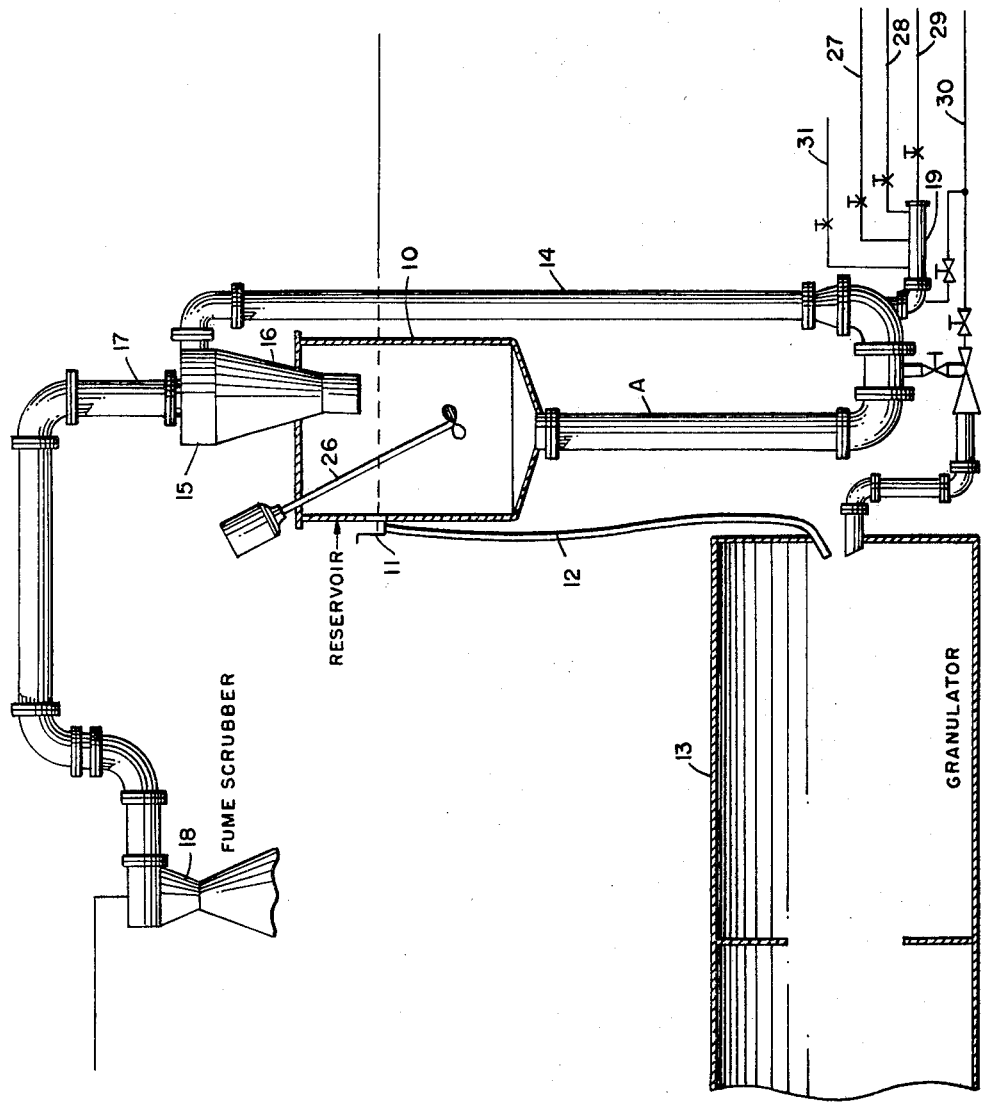

Neutralization of acids with ammonia is the most important reaction in the manufacture of commercial fertilizers. In such operations, to reduce the recycle requirements to a reasonable level, neutralization may be carried out in a separate vessel and the resulting slurry allowed to flow into the drum granulator. The auxiliary reaction vessel is commonly called a preneutralizer. Its function is to react the feed liquids to expel the excess heat through evaporation of water and to concentrate the slurry. During operation of the typical preneutralizer, acids, ammonia, and water are added to the vessel through perforated pipes. When the preneutralizer is operated near its maximum capacity, there is considerable splashing and turbulence which prevent smooth overflow to the granulator. Mildly surging slurry flow makes control of granulation difficult, and extreme surging makes control impossible. Further, ammonia losses are high when excessive turbulence occurs in the preneutralizer.

I have discovered that by employing a cyclone separator above the reservoir or preneutralizer tank so that the discharge is directly into the reservoir, and by recycling slurry through a pipe which has a long vertical leg turned at its top to discharge tangentially into the cyclone separator, the ammonia being added with the reactants at the bottom of the vertical leg, the violence of the reaction occurring in the vertical leg and in the cyclone separator can be converted from a nuisance to an asset. The introduction of ammonia with the acid into the bottom of the vertical recycle leg, serves as an airlift pump as means of lifting the slurry, exposes the maximum liquid surface to ammonia vapor, and the liquid being thrown violently against the wall of the cyclone by centrifugal force exposes the maximum surface for steam escape. The rapidly cooling liquid falls quietly to the surface of the liquid in the reservoir and a portion of the slurry overflows to the granulator drum in proportion to the reactant feed rate.

A primary object, therefore, of the invention is to provide an apparatus for neutralizing acids with ammonia while maintaining a flow control of the slurry fed to the granulator. A still further object is to provide an apparatus which utilizes the violence of the reaction of ammonia with acids being neutralized to give the maximum ammonia absorption and for discharging the material onto a wall surface so as to provide the maximum rate of water evaporation. A still further object is to provide in cooperation with a reservoir provided with a recycle conduit, a cyclone separator discharging into the reservoir and means for introducing ammonia and reactants into the bottom portion of the recycle conduit portion discharging into the the cyclone separator. A still further object is to provide means for spraying acid into an upper portion of the cyclone separator to remove unreacted ammonia, while also providing means for directing the introduced acid toward the inlet of the recycle conduit. Other specific objects and advantages will appear as the specification proceeds.

The invention is shown, in illustrative embodiments, by the accompanying drawings, in which—

Figure 2:
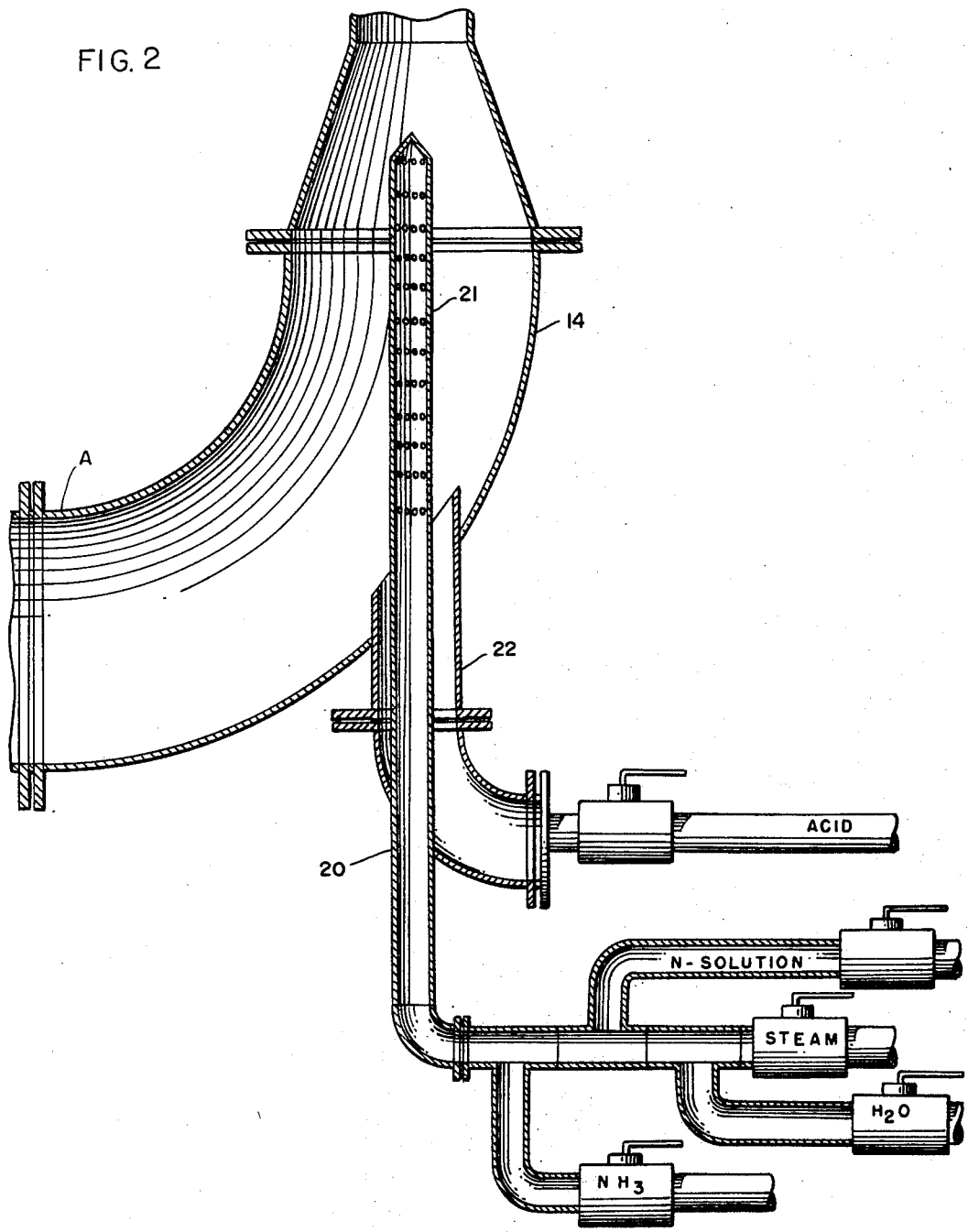
Figure 3:
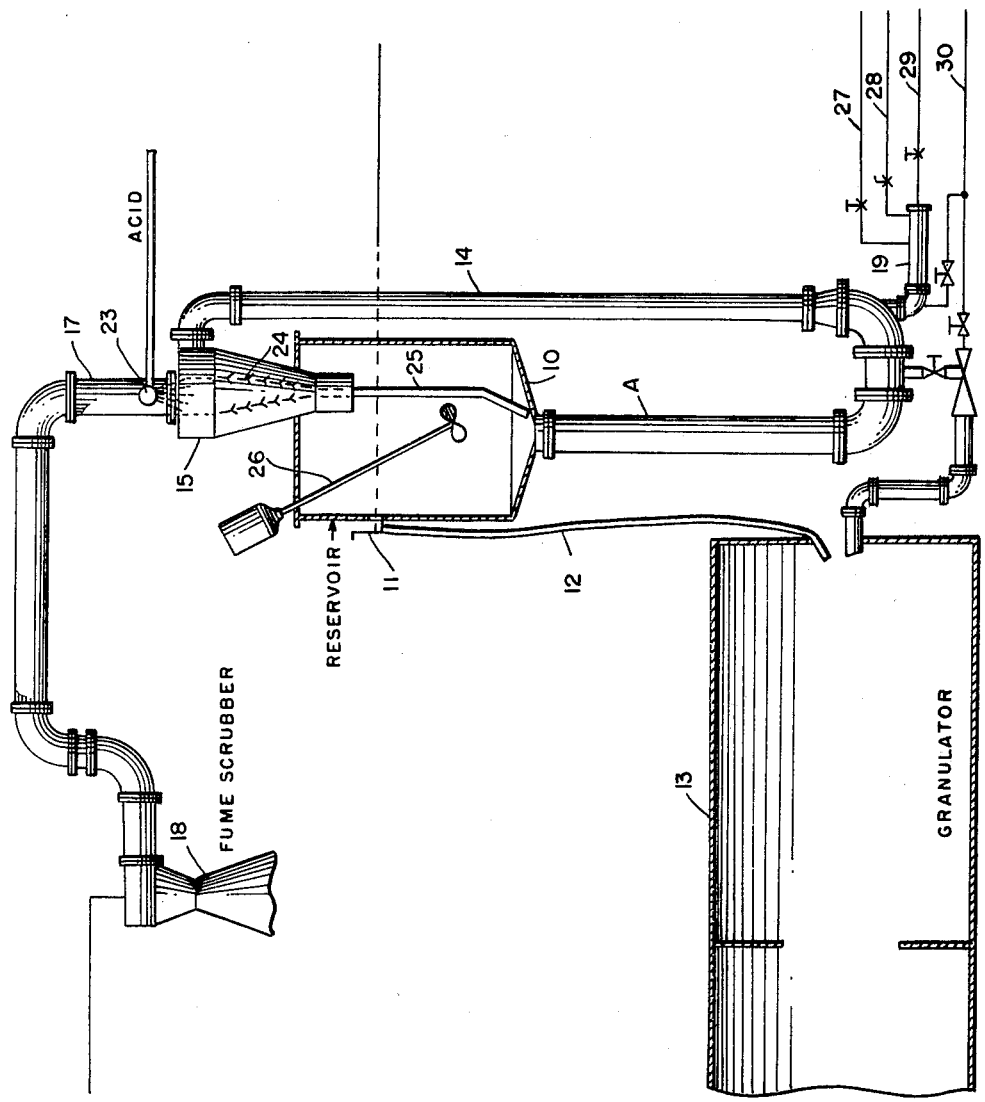

FIG. 1 is a schematic showing, partly in section, of apparatus embodying my invention; FIG. 2, an enlarged detail sectional view of a portion of the recycle conduit into which ammonia and reactants are introduced; FIG. 3, a view similar to FIG. 1 but showing a modified form of apparatus; and FIG. 4, a view similar to FIG. 1 but showing another modified form of apparatus.

In the illustration given, 10 designates a reservoir or preneutralizer tank. The reservoir is provided with an overflow trough 11 from which a conduit 12 leads to a granulator 13. A recycle conduit A communicates at its bottom with a vertical reaction leg 14. The leg 14 is turned laterally at its top and discharges tangentially into a cyclone vessel 15 having a conical lower portion 16 discharging into the reservoir 10. A steam or vapor outlet pipe 17 leads from the upper part of the cyclone separator and extends to a fume scrubber 18 or to other suitable apparatus.

At the bottom of the vertical leg 14, there is an inlet pipe 19 into which ammonia, ammonia-containing solutions, nitrogen solutions, acid, or other desired reactants may be introduced. In FIG. 2, a specific form of apparatus for introducing the ammonia and other reactants is shown. In this structure, the nitrogen solution, steam, and ammonia, together with water, may be introduced through a pipe 20 having a sparging end portion 21. Acid, such as, for example, phosphoric, sulfuric, etc., is introduced through an inlet pipe 22 apertured to receive sparging pipe 20. By introducing the ammonia, nitrogen solution, acid, etc. at the bottom of the vertical leg 14, the leg 14 contains the violence of the reaction, the heat of reaction, and absorption generating steam which persists as bubbles in the high temperature slurry. The bubbles rise through the vertical pipe 14 entraining liquid as they move. The bulk density of the mixture decreases as the bubbles form and displace the liquid slurry so that liquid of a higher density in the reservoir 10 rushes downwardly to displace the low density slurry. As the fresh liquid descends, it brings with it unreacted acid which is neutralized as it reaches the ammonia sparger, forming more steam bubbles. A continuous process is thus set in motion, the mechanism of which is in essence an airlift pump.

The rapidly rising bubble-liquid mixture in the vertical reaction pipe provides the maximum ammonia absorption, discharges violently into the cyclone separator 15 and the liquid is thrown against the wall by centrifugal force. The steam escapes to the center and passes upwardly through the vapor stack 17. The vapor-liquid mixture is at the maximum temperature attained in the system and the maximum liquid surface is exposed, thus resulting in the maximum rate of water evaporation. The rapidly cooling liquid falls quietly onto the surface of the reservoir liquid. The contact time between liquid and gas in the vertical leg 14 is much longer than the time involved in standard sparging in a preneutralizer. The ammonia absorption improves because of the increased time of contact. The recirculating liquid volume is many times the volume of liquid ingredients fed to the system, increasing the liquid to gas ratio which increases the absorption interface and improves the ammonia recovery.

Acid may be fed to the system in any desired manner, as by introducing it into the bottom of leg 14 or by introducing it in the cyclone separator 15 or reservoir 10.

In the illustration given in FIG. 3, the acid is introduced through a spray nozzle 23 within the vapor stack 17, and the acid is directed downwardly into the vessel 15, meeting and removing ammonia that was not absorbed in the vertical reaction pipe 14. With this structure, I prefer to employ a cone of baffles 24 in the vessel 15 to keep the acid separated from the slurry and to direct it toward the outlet pipe 25 leading to the bottom of vessel 10. A mechanical agitator 26 is provided for stirring the liquid within reservoir 10. If desired, the reservoir 10 may be left completely open, thus permitting constant observation of the slurry condition by the plant operator.

By way of specific example, the process was carried out in apparatus as shown in FIG. 1, making a 14-49-0 slurry in which all of the phosphorus was derived from wet process 54 percent $P_2O_5$ acid and neutralized with anhydrous ammonia, the slurry density being approximately 1.500 g./cc. and the slurry temperature being between 250° and 260° F. In the operation, water and steam were first turned on, using the arrangement shown in FIG. 1, and when the water covered the ammonia sparger 21, the acid was introduced through pipe 22. Ammonia and/or nitrogen solution was then turned on for a selected flow rate. When the liquid appeared in the reservoir 10 and recirculation of slurry began through the cyclone separator 15, the steam flow was reduced gradually until shut off completely, the heat of reaction being sufficient to give continuous operation. The end of the run was anticipated in time by the operator to shut off the feed to the vessels 15 and 10 and to drain them at the same rate that slurry was produced until they were empty.

Slurry was produced in the cyclone separator and reservoir at four times the rate achieved by standard preneutralization under the conditions in which the reservoir and preneutralizer tank were of the same size, the density and moisture content of the slurry being similar, the temperature of the slurries being the same, and ammonia losses being equal. At equal production rates and comparable hold times, the apparatus shown in FIG. 1 can be used to produce a slurry containing less water and having a higher density, at a higher temperature, having a more uniform flow rate, and with less ammonia loss.

In the apparatus shown in FIG. 3, the acid is sprayed into the steam exhaust stack 17 at the top center of the vessel 15. The incoming acid is heated and diluted by the steam and, in turn, scrubs the unabsorbed ammonia that would otherwise escape, greatly reducing the ammonia loss from the system. The descending acid is kept separate from the slurry in vessel 15 by the circular louvered baffles 24 as it passes down to the centrally-positioned pipe 25 which conducts the acid to the bottom of the reservoir, discharging near the opening to the descending portion of the reaction pipe A. Some slurry can be carried over into the descending acid stream without affecting the operation, although most of the slurry is held on the cyclone wall by centrifugal force. The acid does not splash out into the slurry because the steam movement is toward the acid stream. Acid is mixed with a large quantity of recycling slurry as it leaves the central pipe 25.

The desired reaction at the base of the vertical recycle leg or pipe 14 may be accomplished in a number of ways. The reactants may all be introduced through a pipe 19, as shown in FIG. 1. By way of example, nitrogen solution may be introduced through pipe 27, ammonia may be introduced through pipe 28, water may be introduced through pipe 29, steam may be introduced through pipe 30, and acid may be introduced through pipe 31. A preferred arrangement for the introduction of these materials is shown in FIG. 2. The valve-controlled pipes permit the regulated introduction of ammonia or nitrogen solution, or both, together with steam and any desired amount of water, while also acid is being introduced through pipe 22.

In the arrangement shown in FIG. 3, all of the acid may be introduced through the spray nozzle 23, the acid being directed by baffles 24 downwardly and into pipe 25 and thence downwardly into the bottom of leg 14 where the acid meets the ammonia or nitrogen solution. If desired, however, a substantial portion of the acid may be introduced into pipe 19, as shown in FIG. 1, and the remainder of the acid introduced through spray nozzle 23.

In the modification shown in FIG. 4, the separator 10 is omitted and the cyclone separator 15a is equipped at its bottom with an overflow conduit 12a adapted to discharge into a granulator 13, such as is shown in FIG. 1. In effect, the reservoir 10 is reduced in diameter until it is essentially a pipe A' of substantially the same size as pipe A in FIG. 1. The cyclone separator 15a thus may be said to be a combined reservoir and cyclone separator serving both as a separator and reservoir and providing an overflow leading to the granulator. The operation is substantially as described in connection with FIG. 1, the recycled slurry being mixed with acids, ammonia, nitrogen solution, steam, etc. through inlet pipes 20a and 22a, and the rapidly rising bubble-liquid mixture in the vertical reaction pipe 14a provides the maximum ammonia absorption, discharges violently into the cycle separator 15a, and the liquid is thrown against the wall by centrifugal force, steam escaping through pipe 17a. Material overflowing into the conduit 12a is discharged into a granulator 13.

While in the foregoing specification, I have shown the invention in considerable detail for the purpose of illustrating embodiments of the invention, it will be understood that such details may be varied widely by those skilled in the art without departing from the spirit of my invention.

I claim:

1. In combination with a reservoir provided with an overflow to a dryer granulator, a cyclone separator supported above said reservoir and having a cone bottom discharging into said reservoir, a recycle conduit extending downwardly from the cone bottom of said reservoir and thence upwardly to provide a vertical reaction leg, said reaction leg extending laterally and discharging tangentially into said separator, spray means for spraying acid into the upper portion of the separator to remove ammonia which is not reacted in said vertical leg, baffles in a cone formation in said separator for confining the acid and directing it toward said cone bottom, and pipe means for directing the acid from said separator to the inlet of said recycle conduit.

References Cited

UNITED STATES PATENTS

| | | | |
|---|---|---|---|
| 2,890,935 | 6/1959 | Lloyd | 23—107 |
| 3,238,021 | 3/1966 | Webber et al. | 23—259.1 |
| 3,310,371 | 3/1967 | Lutz | 23—107 |

JAMES H. TAYMAN, JR., Primary Examiner

U.S. Cl. X.R.

23—274, 285, 260, 273; 71—37, 39; 23—107, 103; 55—459, 83, 235, 440, 442